(No Model.)
H. C. PRATT.
WIRE REEL.
No. 294,670.  Patented Mar. 4, 1884.
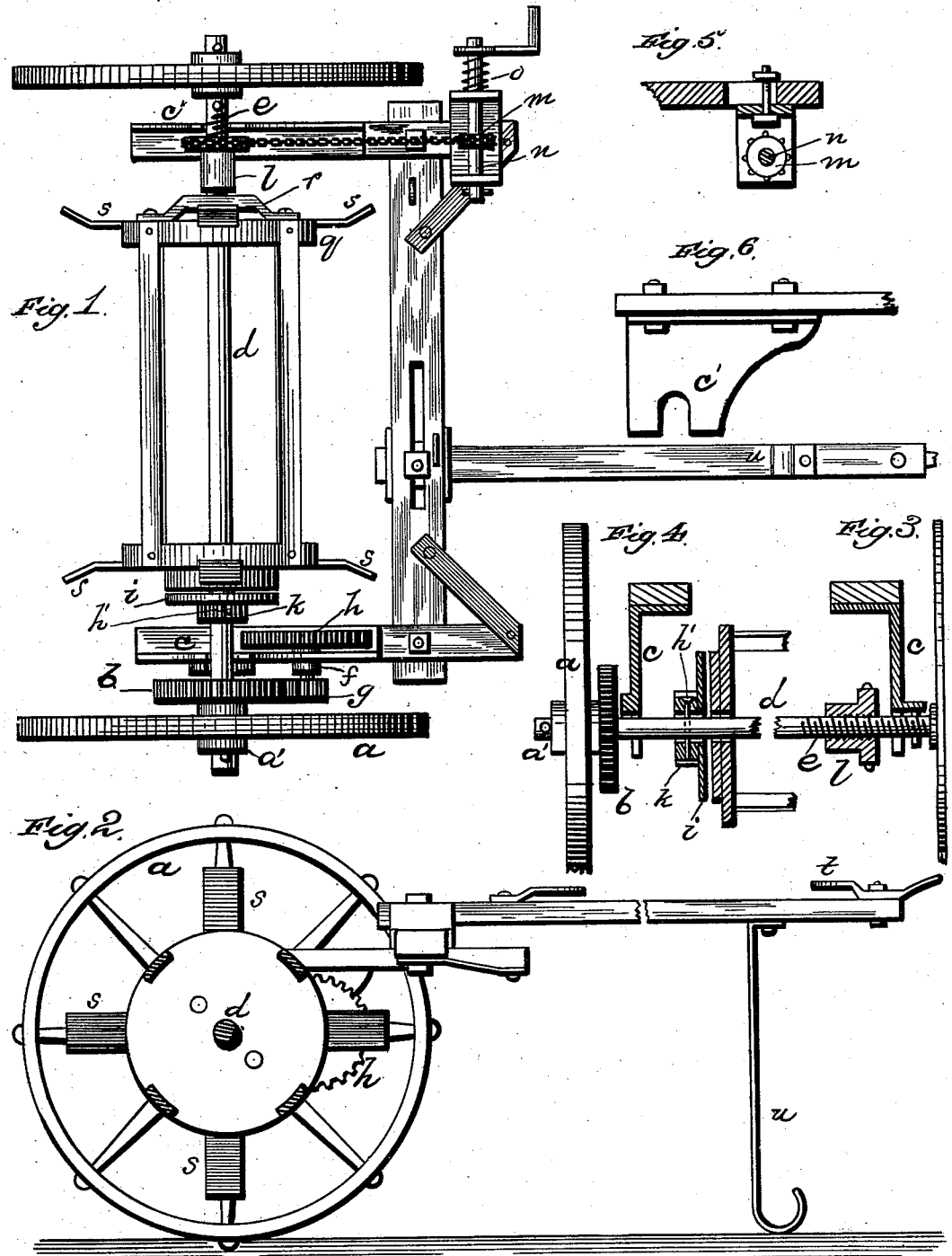
WITNESSES
INVENTOR
Henry C. Pratt
by Anderson & Smith
his ATTORNEYS

UNITED STATES PATENT OFFICE.

HENRY C. PRATT, OF CANANDAIGUA, NEW YORK.

WIRE-REEL.

SPECIFICATION forming part of Letters Patent No. 294,670, dated March 4, 1884.

Application filed September 17, 1883. (No model.)

*To all whom it may concern:*

Be it known that I, H. C. PRATT, a citizen of the United States, residing at Canandaigua, in the county of Ontario and State of New York, have invented certain new and useful Improvements in Wire-Reels; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is an inverted plan view of my device. Fig. 2 is a sectional view, cutting away one of the wheels. Fig. 3 is a sectional detail, showing the screw-pulley. Fig. 4 is a sectional view of a portion of the reel and its attachments on the axle; and Fig. 5 is a detail sectional view of the frame, showing the chain-pulley; and Fig. 6 is a view of one of the horseshoe-bearings attached to a portion of one of the side beams of the frame.

This invention has relation to reels for reeling and unreeling barbed wire for fences; and it consists in the construction and novel arrangement of devices, as will be hereinafter fully described, and particularly pointed out in the claims appended.

Referring by letter to the accompanying drawings, $a$ designates the drive-wheel, which has a cast-iron hub, $a'$, to which a gear-wheel, $b$, is bolted.

$c$ and $c'$ designate the horseshoe-bearings for the axle $d$, which is threaded near one end for a portion of its length, as shown at $e$.

The box $f$ carries a pinion, $g$, and a gear-wheel, $h$, on the same shaft, but on opposite sides of the box or bearing $f$. A plate, $i$, having a gear-wheel, $k$, on its outer face, is slipped upon the axle near the drive-wheel end, and is temporarily keyed to the axle, so that it will not revolve with the spool or spools that carry the wire until it has been put into engagement with the gear-wheel $h$, the key $h'$ being first removed, and the gear-wheel $k$ moved outwardly by driving the spool along the axle by the pulley-nut $l$ at the threaded end of the axle. This engagement is necessary when the machine is being driven backward to reel up the wire when a fence is to be removed. When the wire is to be unreeled from the spool to build a fence, the gear-wheel $k$ is keyed to the axle, and the head of the spool is pressed against the plate $i$ by turning up the nut $l$. The free end of the wire on the spool should be fastened to a post before starting, and when the machine is driven ahead the wire will of necessity be reeled off, and the tightness to which it can be drawn is regulated by the pressure of the spool against the plate $i$.

To put on or take off a spool, or spools where several wires are to be handled at one time, the drive-wheel must be removed and the frame lifted from the axle before they can be put on or removed, as the case may be.

The nut $l$ is preferably made with teeth on its periphery, to fit the links of a chain operated by a smaller adjustable pulley, $m$, on a crank-shaft, $n$. Lateral motion is imparted to the pulley $m$ by spiral springs $o$ on the shaft $n$, so that as the pulley-nut $l$ is turned back and forth on the axle the springs $o$ will shove this pulley $m$ and the chain correspondingly.

The reel-heads are of metal, and are connected by rods. The head $q$ is provided with a spring, $r$, which is interposed between said head and the pulley-nut $l$.

The reel-arms $s$ are cast separately and bolted to the reel-heads.

The spools as they come from the factory filled may be used, and if the axle is not fully covered iron washers may be employed to fill the space left vacant. When the wire is to be reeled on an empty spool, the team is reversed, their heads being toward the machine. The whiffletree is then connected to the piece $t$ at the point of the tongue, and an extension of the piece $t$ is used to guide the machine. The rims of the wheels are studded to prevent slipping. The frame is made in three pieces of wood, properly braced, and the tongue is made laterally adjustable to regulate the draft. A spring-support, $u$, is secured to the tongue, to be used when the team is reversed.

Having thus fully described my invention, what I claim as new, and desire to secure by Letters Patent, is—

1. In a reel for barbed wire for fences, the combination, with the threaded axle and pulley-nut thereon, of the spool, geared frictionplate, removable geared drive-wheel, and intermediate gearing, substantially as specified.

2. In a reel for barbed wire for fences, the combination, with the threaded axle carrying the reel and grooved pulley-nut, of the chain, pulley, and crank arranged upon the forward end of the frame for moving the reel into engagement with the operating mechanism at the opposite end of the frame and reel, substantially as specified.

In testimony whereof I affix my signature in presence of two witnesses.

HENRY C. PRATT.

Witnesses.
WARREN FAKE,
WILLIAM LYSAGHT.